United States Patent [19]

Edwards et al.

[11] Patent Number: 4,808,303
[45] Date of Patent: Feb. 28, 1989

[54] PRODUCE HYDRATION SYSTEM

[75] Inventors: Tim L. Edwards, Oregon City; James A. Aamodt, Canby, both of Oreg.

[73] Assignee: Fractal, Inc., Clackamas, Oreg.

[21] Appl. No.: 898,928

[22] Filed: Aug. 21, 1986

[51] Int. Cl.⁴ .................. B01D 36/00; B05B 12/02; B05B 15/00
[52] U.S. Cl. .................. 210/138; 210/141; 210/153; 210/202; 210/257.1; 210/259; 210/423; 312/115; 62/247; 239/70; 239/106; 239/320
[58] Field of Search ........... 312/115; 62/231, 247, 62/311; 99/487, 536; 210/138, 141, 153, 192, 202, 251, 257.1, 259, 295, 409, 422, 423, 433.1; 239/69, 70, 96, 99, 106, 113, 119, 124, 289, 320, 323, DIG. 15

[56] References Cited

U.S. PATENT DOCUMENTS

| Re. 19,973 | 5/1936 | Forman | 62/104 |
|---|---|---|---|
| 599,009 | 2/1898 | Palmer et al. | 210/192 |
| 1,778,141 | 10/1930 | Birdsong et al. | 62/247 |
| 1,827,175 | 10/1931 | Taylor et al. | |
| 1,889,499 | 11/1932 | Rorrer et al. | |
| 1,894,813 | 1/1933 | Zarotschenzeff | 62/311 |
| 1,908,968 | 5/1933 | Forman | |
| 1,930,983 | 10/1933 | Russell | 239/DIG. 15 |
| 1,950,204 | 3/1934 | Wood et al. | 261/117 |
| 1,987,796 | 1/1935 | Rorrer et al. | 312/117 |
| 1,995,729 | 3/1935 | Zarotschenzeff | 62/247 |
| 2,011,731 | 8/1935 | Rorrer et al. | 62/89.5 |
| 2,025,063 | 12/1935 | Loepsinger | 169/37 |
| 2,039,768 | 5/1936 | Bird | 239/99 |
| 2,039,769 | 5/1936 | Bird | 239/99 |
| 2,050,353 | 8/1936 | Matteson et al. | 62/89.6 |
| 2,065,358 | 12/1936 | Zarotschenzeff | 99/194 |
| 2,066,312 | 1/1937 | Bales | 62/39.5 |
| 2,097,530 | 11/1937 | Peddicord | 62/39.5 |
| 2,279,521 | 4/1942 | Peterson | 211/127 |
| 2,305,435 | 12/1942 | McAfee | 211/127 |
| 2,492,308 | 12/1949 | Menges | 99/194 |
| 2,531,506 | 11/1950 | Geneck | 62/89.5 |
| 2,533,913 | 12/1950 | Booth | 62/89.5 |
| 2,625,806 | 1/1953 | Kennedy | 312/115 |
| 2,650,003 | 8/1953 | Coleman | 239/113 |
| 2,800,365 | 7/1957 | Hodges | 239/119 |
| 3,184,113 | 5/1965 | Curtis | 239/323 |
| 3,389,797 | 6/1968 | Giardini | 210/138 |
| 3,547,154 | 12/1970 | Benham | |
| 3,669,352 | 6/1972 | Zaphiris | |
| 3,708,119 | 1/1973 | Vicard | 239/11 |
| 3,788,542 | 1/1974 | Mee | 239/2 R |
| 3,794,179 | 2/1974 | Doucet | 210/433.1 |
| 3,933,006 | 1/1976 | South | 62/231 |
| 3,991,939 | 11/1976 | Maclay | |
| 4,179,900 | 12/1979 | Corrigan | 62/247 |
| 4,193,872 | 3/1980 | Parkinson | 210/409 |
| 4,527,745 | 7/1985 | Butterfield et al. | 239/600 |

OTHER PUBLICATIONS

KES Irrigation Systems, Inc. Documents.
*The Oregonian*, "Lake Oswego Safeway Given Aspects of Gourmet's Dream", Kim Severson.
Detroff, J., *Supermarket News*, "Tomorrow's Produce Dept. is Finding Itself Today", Oct. 21, 1985.

Primary Examiner—Richard V. Fisher
Assistant Examiner—Linda S. Evans
Attorney, Agent, or Firm—Klarquist, Sparkman, Campbell, Leigh & Whinston

[57] ABSTRACT

The present invention represents an automatic produce hydration system of improved efficiency and design. The system is self-contained, and adaptable for use in both pre-existing and new produce display racks. The system first includes a filter unit designed to remove foreign particulate materials from incoming water. In fluid communication with the filter unit is an automatic filter cleaning system for ejecting collected foreign particulate materials from the system at selected time intervals. After filtration, the water is introduced into a pressurization system. Once the pressure has been increased, pressurized water is delivered through an external water delivery line having a plurality of spray heads associated therewith. The spray heads have restriction means therein to ensure that a fine mist-like spray is delivered to the produce materials. The pressurized water delivery system also ensures that the flow of water through the spray heads occurs instantaneously, thereby eliminating the initially slow delivery of water and gradual increase to full delivery pressure characteristic of non-pressurized systems. In fluid communication with the external water delivery line is a drippage control system which prevents water from dripping onto the produce materials from the spray heads after the delivery of water thereto has stopped. A timer control unit is used to coordinate all of the systems and subsystems of the present invention to ensure smooth, efficient, and automatic operation.

25 Claims, 3 Drawing Sheets

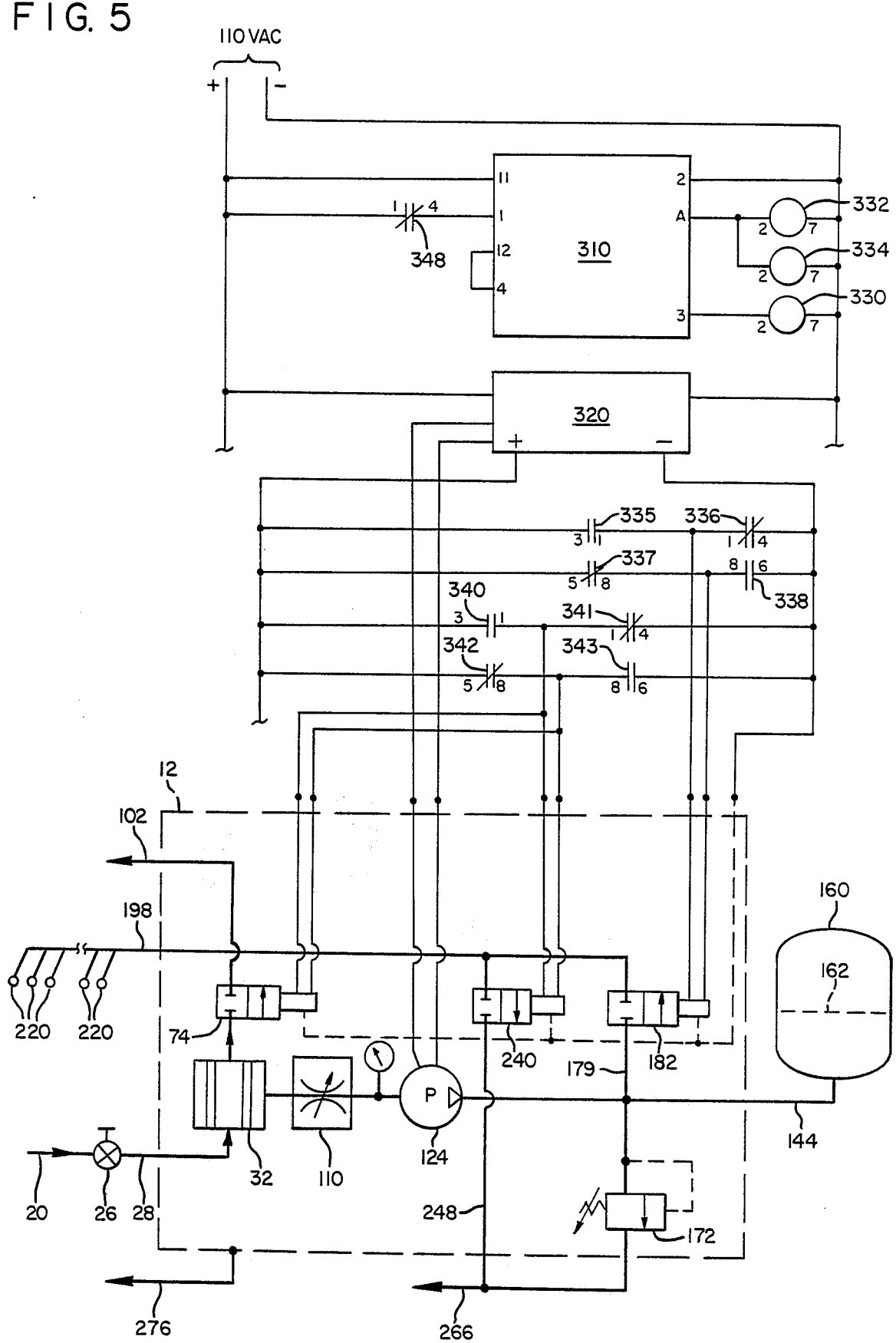

PRODUCE HYDRATION SYSTEM

BACKGROUND OF THE INVENTION

The present invention generally relates to produce hydration systems, and more particularly to a produce hydration system of improved efficiency designed to deliver a timed water mist to produce in a display rack. The system is further designed to include a water filter and automatic cleaning means associated therewith, drippage control means for preventing undesired water drippage when the system is not operating, pressurization means for increasing the water pressure throughout the system, and a timer unit for controlling the system.

To maintain the freshness and desirable appearance of produce materials in a supermarket, the produce must be kept sufficiently moist and cool. Otherwise, the produce will dehydrate, resulting in an unattractive appearance and reduced salability. The amount of moisture typically used to maintain proper hydration must be carefully controlled. If too much moisture is used, the produce materials can lose their crisp texture and are increasingly susceptible to bacterial and fungal attack. Also, the application of excess moisture frequently results in spillage onto the floor adjacent the produce display rack, causing potential safety and liability problems for the store owner. As noted above, insufficient moisture levels will eventually result in dehydration of the produce materials, adversely affecting the quality of the produce.

To ensure proper hydration, traditional methods involve the manual application of water to the produce in the display rack by a store employee using a water spray gun. However, this method is labor intensive, and frequently involves the application of improper amounts of water by new and unskilled employees. Likewise, stores which remain open on a 24 hour basis must have an employee on duty during the night to ensure that proper hydration is maintained. Stores which close at night must go through the procedure of carefully covering the produce with sheets of burlap or the like in order to prevent moisture loss.

To provide a more efficient method of hydrating produce, systems have been developed which incorporate water delivery units directly into the produce display racks. For example, U.S. Pat. No. 2,625,806 to Kennedy involves a produce display rack having a timed water delivery system. Such system includes a supply conduit having a filtration strainer therein. Water from the supply conduit is routed through a cooling coil and thereafter through a plurality of spray nozzles. The system may be manually controlled or controlled using a timer connected to a solenoid-actuated valve within the supply conduit.

U.S. Pat. Nos. 2,039,768 and 2,039,769 to Bird both disclose produce hydration systems using complex mechanical components. Specifically, both systems use a nozzle arrangement mounted on a movable shaft. The movable shaft is connected to a motor which causes the shaft and nozzles to oscillate during operation. To control water flow through the nozzles, complex timing systems are used to start and stop the flow of water through the nozzles.

Another system is that sold and marketed by the KES Irrigation Company. The KES system uses a nozzle assembly mounted to a produce rack. Water is delivered to the nozzles through a conduit system having a single ball valve therein The ball valve is connected to a timer unit which activates the system at selected intervals.

A recently developed system involving a different approach is now being used in stores owned by the Safeway Company. This system is termed a "Sonic Mister" and involves the constant application of a fog through a plurality of pipe-like outlets above the produce display rack. Such fog consists of extremely small water droplets, and must be continually applied to the produce.

The present invention represents a new and highly efficient produce hydration system incorporating features not heretofore known in other systems, including those discussed above. These features will be further discussed herein, and represent a substantial advance in the field of produce hydration.

SUMMARY OF THE INVENTION

It is an object of the present invention to provide a produce hydration system which delivers a fine mist of water to produce in a display rack at selected time intervals.

It is another object of the present invention to provide a produce hydration system which is easy to install in either pre-existing or new produce racks.

It is still another object of the present invention to provide a produce hydration system which is capable of operating efficiently with a minimum number of internal components.

It is still another object of the present invention to provide a produce hydration system which is capable of operating automatically with a minimal amount of maintenance.

It is a further object of the present invention to provide a produce hydration system which includes filter means to remove undesired foreign particulate materials from water delivered to the system, such filter means having an automatic cleaning system associated therewith to remove collected particulate materials at selected time intervals.

It is a still further object of the present invention to provide a produce hydration system having means therein for increasing the water pressure within said system in order to permit water to be delivered to the produce display rack instantly.

It is a still further object of the present invention to provide a produce hydration system which includes drippage control means therein in order to prevent undesired water drippage onto the produce materials in the display rack when the system is not operating.

It is an even further object of the present invention to provide a produce hydration system having its various subsystems coordinated through the use of an automatic timer control unit.

It is an even further object of the present invention to provide a produce hydration system capable of increasing the profitability, reducing the labor costs, and reducing produce shrinkage associated with commercial supermarket produce departments.

In accordance with the above objects, the present invention involves an automatic produce hydration system of improved efficiency and design. The system is primarily self-contained, and adaptable for use in both pre-existing and new produce display racks. To ensure that the water being introduced into the system is substantially free from foreign particulate materials, the invention first includes a filter unit through which feed water initially flows. The filter unit collects undesired foreign particulate materials, and such materials are automatically ejected from the system at selected time intervals using a cleaning system in fluid communication with the filter unit. After filtration, the water is then pressurized using a pressurization system. At selected time intervals, the pressurized water is released into an external water delivery line having a plurality of spray heads associated therewith. The spray heads have restriction means therein to ensure that a fine mist-like spray is delivered to the produce materials at selected time intervals. Also, the pressurization system of the invention ensures that the flow of water through the spray heads occurs instantaneously, thereby eliminating the initially slow delivery of water and gradual increase to full delivery pressure characteristic of non-pressurized systems. In association with the water delivery system of the present invention, a drippage control system is provided which prevents water from dripping onto the produce materials from the spray heads after delivery from the heads has stopped. All of the above-described features and subsystems in the invention are coordinated using an automatic timer control unit which actuates the system at selected time intervals and controls spray duration.

These and other objects, advantages, and features of the present invention will become apparent to those of ordinary skill in the art in view of the detailed description and the drawing figures provided herein.

BRIEF DESCRIPTION OF THE DRAWINGS

FIG. 5 is a schematic illustration of the present invention showing the electrical and mechanical components thereof.

DETAILED DESCRIPTION

Figure 1:
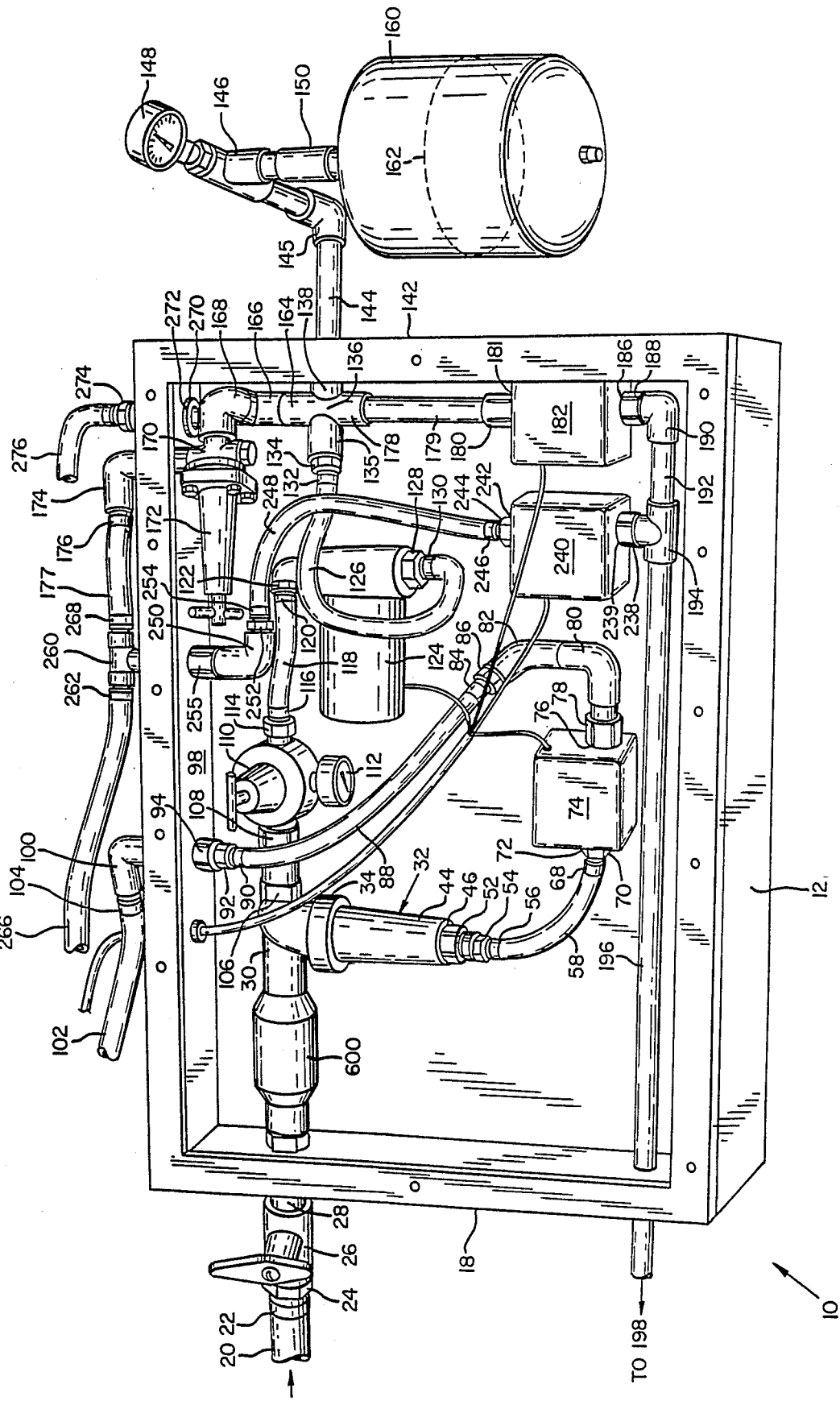
FIG. 1 is a top plan view of the enclosure box of the present invention with the lid removed to show the working components therein
Figure 2:
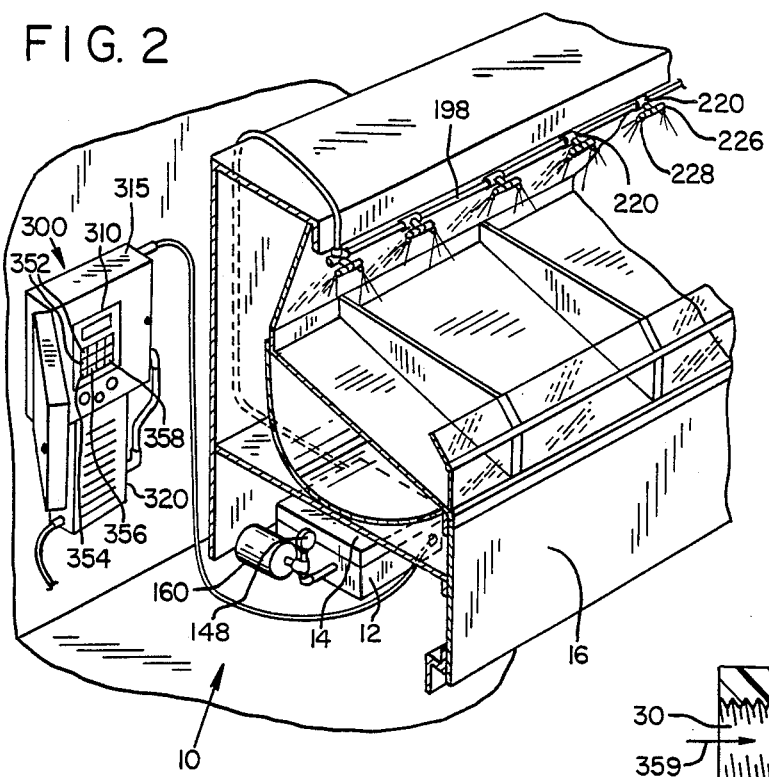
FIG. 2 is a perspective view of the present invention after installation in a conventional produce display rack.

The present invention 10 represents an improved produce hydration system characterized by superior operating efficiency. As shown in FIG. 1, the majority of working components used in the invention 10 are contained within an enclosure box 12. The enclosure box 12 contains a lid 14 (FIG. 2), and enables the working components of the invention 10 to be positioned either on top of the produce rack with which it is associated, or beneath the rack, depending on the type of rack being used. FIG. 2 shows the enclosure box 12 and associated components beneath a produce display rack 16.

Figure 3:
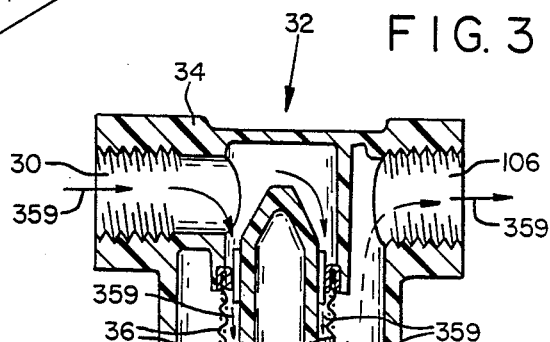
FIG. 3 is a cross sectional view of the filter unit of the present invention.

With continued reference to FIG. 1, at the side wall 18 of the enclosure box 12, a water inlet line 20 is provided. The water inlet line 20 is preferably manufactured of high pressure, ½" diameter PVC braided reinforced hose and is connected to an external source of water. The water inlet line 20 is further connected using a clamp 22 and connector 24 to a manually operable shut-off valve 26, should it be desired to stop the flow of water into the system The manually operable shut-off valve 26 is connected to a fitting 28 through side wall 18 of the enclosure box 12. The fitting 28 is attached to an inlet 30 of a filter unit 32. The filter unit 32 is preferably of the type manufactured by the Spraying Systems Company, Model 124A-SC, which is capable of handling water pressures of up to 110 p.s.i. The filter unit 32 is shown in detail in FIG. 3, and includes a top portion 34, inner cylindrical strainer 36 having a 200 mesh screen, hollow center post 38 having ports 40, and rubber washer 42. The filter unit 32 also includes a body portion 44 with a particulate drain outlet 46. With continued reference to FIG. 3, the end 48 of the center post 38 is open and extends through the outlet 46. Adjacent the outlet 46 is a rubber washer 50 and coupling member 52. The functional relationship of these components will be further discussed below.

Attached to the coupling member 52 using connector 54 and clamp 56 is a flexible conduit 58 made of the same material as inlet line 20. The flexible conduit 58 is connected using a clamp 68 and connector 70 to the inlet 72 of a filter purge valve 74. The filter purge valve 74 is a solenoid-actuated ball valve, manufactured by the Spraying Systems Co., Model No. 344E, ⅜"12 VDC (double pole, double throw, center off type). Attached to the outlet 76 of the valve 74 using fitting 78 are PVC plastic pipe sections 80 and 82. Attached to pipe section 82 using a clamp 84 and connector 86 is a flexible conduit 88 of the same type of material as conduit 58. The flexible conduit 88 is attached using a clamp 90 and connector 92 to a fitting 94. The fitting 94 is inserted within the side wall 98 of the enclosure box 12. Secured to the fitting 94 at the outside of the enclosure box 12 is a connector 100 to which a particulate drain line 102 is attached using a clamp 104. The drain line 102 is preferably constructed of clear PVC plastic tubing ¾" in diameter.

Referring back to the filter unit 32 shown in FIG. 1, the top portion 34 further includes a water flow outlet 106 to which a fitting 108 is attached. The fitting 108 is connected to a manually adjustable pressure regulator 110 having a pressure gauge 112 associated therewith. Attached to the pressure regulator 110 using connector 114 and clamp 116 is a flexible conduit 118 (PVC braided reinforced, ½" diameter) which is secured using a clamp 120 and connector 122 to a motorized pump 124. The motorized pump 124 is incorporated into the system when the pressure from the external water supply is less than 50 p.s.i. A pump 124 usable in the invention 10 is manufactured by the Shur-Flo Company under the name "Rambo", Model No. 2193-08-820-15 (12 VDC). This pump includes internal micro-switch pressure sensors designed to operate the pump on demand. Ir the external water pressure is greater than 50 p.s.i., the pump 124 may be omitted.

With continued reference to FIG. 1, a flexible conduit 126 (PVC braided reinforced, ½" diameter) is attached to the pump 124 using connector 128 and clamp 130. The flexible conduit 126 is then connected using clamp 132 and connector 134 to the first port 135 of a multi-port PVC fitting 136. The second port 138 of the multi-port fitting 136 abuts the side wall 142 of the enclosure box 12, and is connected through the wall 142 to a ¾" diameter PVC plastic pipe section 144 Attached to the section 144 is a connecting portion 145 and coupler 146 to which a pressure gauge 148 is attached Also attached to the coupler 146 is fitting 150 secured to a water pressurization tank 160. The tank 160 is preferably of the type manufactured by the Well Company under the name "X-Trol" No. 102 (two gallon capacity). It includes an internal water-tight diaphragm 162, the function of which will be discussed below.

Connected to the third port 164 of the multi-port fitting 136 are pipe sections 166, 168 to which connector 170 and associated pressure release valve 172 are attached. Secured to the connector 170 and associated valve 172 through the side wall 98 is a connector 174, clamp 176, and drain line 177 made of clear PVC μ" diameter hose. The pressure release valve 172 is designed to allow the release of water from the system should undesirably high pressures develop therein (in excess of 100 p.s.i.).

Secured to the fourth port 178 of the multi-port fitting 136 is a μ" diameter PVC water delivery pipe 179 connected to a fitting 180 in the inlet 181 of a water flow control valve 182 of the same type as valve 74 discussed above. Attached to the outlet 186 of the valve 182 is a fitting 188 and connecting section 190 to which a ¾" diameter PVC pipe section 192 is attached. The pipe section 192 is secured to a T-connector 194 which is attached to a ¾" diameter PVC delivery conduit 196. The delivery conduit 196 is ultimately connected to a ¾" diameter PVC external water delivery line 198 which is attached to the produce display rack 16 as shown in FIG. 2. The length of the external water delivery line 198 is substantially equal to that of the rack 16.

Figure 4:
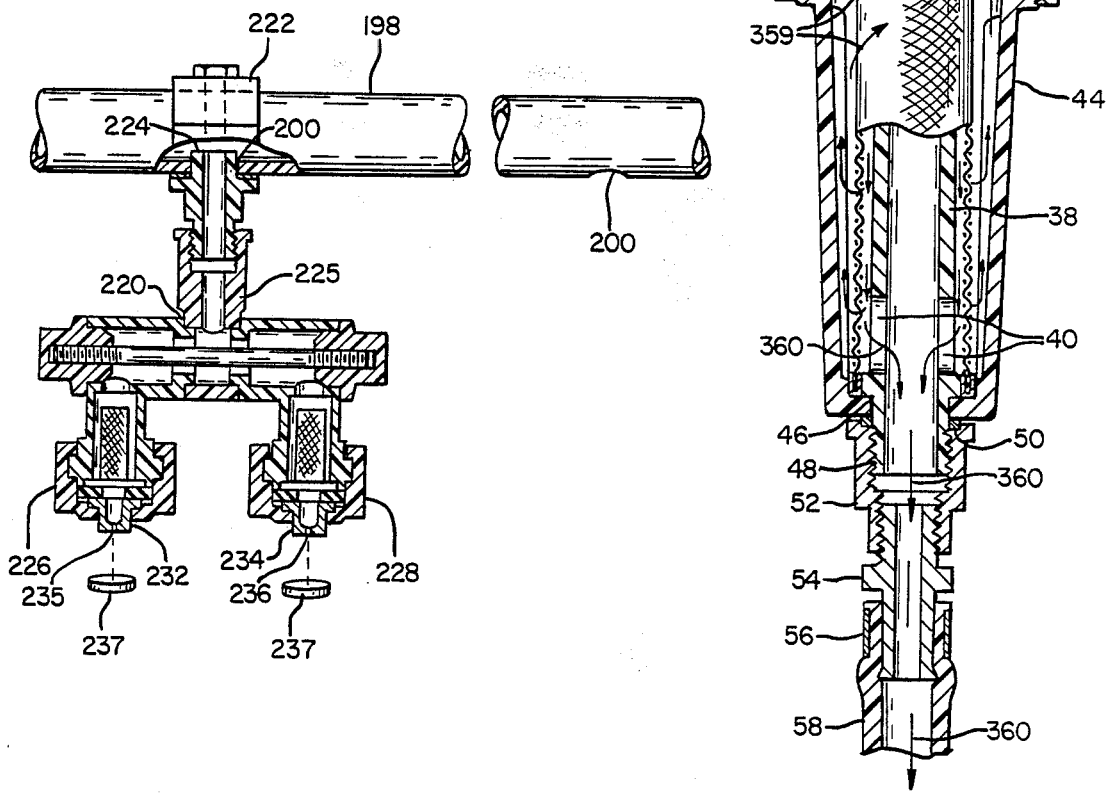
FIG. 4 is a side view of the external water delivery line of the present invention having a spray nozzle assembly attached thereto, the spray nozzle assembly being shown in cross section.

As shown in FIG. 4, the external water delivery line 198 includes a plurality of openings 200. Secured to each of the openings 200 is a spray nozzle assembly 220 shown in FIG. 4 and available from the Spraying Systems Company. The nozzle assembly 220 includes a hanger 222 having an inlet portion 224 adapted for placement within each opening 200 when the nozzle assembly 220 is secured to the external water delivery line 198. With reference to FIG. 4, attached to the hanger 222 is a connecting conduit 225 to which two pivotally movable spray heads 226 and 228 are attached. The spray heads 226, 228 are of the type manufactured by the Spraying Systems Company under U.S. Pat. No 4,527,745, which explains their operation. Each spray head 226, 228 includes a flow-restricting spray tip 232, 234. Each spray tip 232, 234 has a small hole 235, 236 therein through which water passes. The holes 235, 236 restrict the flow of water through the tips 232, 234.

In the presently described embodiment of the invention 10, it is preferred that the spray head 228 which is pointed toward the rear of the produce rack 16 during use be of the type capable of delivering a fan-like spray. In order to accomplish this, the spray tip 234 of the spray head 228 is preferably of the type sold by the Spraying Systems Company under the name "Unijet", Model No. 730023. Conversely, it is desired that the spray tip 232 in the spray head 226 which is pointed toward the front of the produce rack 16 during use be capable of delivering a conical mist to the produce. To accomplish this, the spray tip 232 of the spray head 226 is preferably of the type sold by the Spraying Systems Company under the designation "S.F.3" or "S.F.2."

The spray nozzle assembly 220 and components associated therewith are designed to deliver a cooling mist to the produce materials in the rack, the mist having a droplet size of 50–60 microns, as opposed to the delivery of a fog which typically involves a droplet size of approximately 10 microns. A 50–60 micron droplet size provides effective hydration and cooling of the produce materials, but is barely perceptible to shoppers coming in contact with the mist. It should also be noted that the external water delivery line 198 is plugged at its terminal end in order to prevent water leakage.

The spray nozzle assemblies 220 in the external water delivery line 198 are preferably spaced approximately 18 inches along the line 198 for maximum effectiveness. However, this may vary at the discretion of the user. In addition, if there is a specific portion of the produce rack to which water delivery is not needed, optional nozzle caps 237 are provided to fit over the spray tips 232, 234 to prevent water delivery therefrom.

Referring back to FIG. 1, the T-connector 194 is secured to a fitting 238 which is attached to the inlet 239 of a drippage control valve 240 of the same type as valve 74 discussed above. The valve 240 has an outlet 242 to which a connector 244, clamp 246, and flexible conduit 248 (PVC braided reinforced ⅜" diameter) are attached. The conduit 248 is attached to a pipe section 250 using a connector 252 and clamp 254. Attached to the pipe section 250 is a fitting 255 which extends through side wall 98. Secured to the fitting 255 is a T-connector 260. Attached to the T-connector 260 using a clamp 262 is a drain line 266 preferably made of ¾" diameter clear PVC hose. Also secured to the T-connector 260 using clamp 268 is the drain line 177. The T-connector 260 is designed so that water can flow therethrough from line 177 into line 266. Finally, at position 270 within the enclosure box 12, is an opening 272 to which a fitting 274 is attached Secured to the fitting 274 is a drain line 276 preferably made of ¾" diameter clear PVC hose. The drain line 276 is designed to allow the drainage of water from the enclosure box 12 if a water leak occurs within the box 12.

In order to coordinate the operation of valves 74, 182, and 240 within the invention 10, an electrical timer control system is provided, designated generally at 300. With reference to FIGS. 2 and 5, the system 300 basically includes a timer unit 310, AC/DC inverter 320, and relay units 330, 332, and 334. As shown in FIG. 2, the timer unit 310 and relay units 330, 332, 334 are preferably contained within a housing 315. The timer unit 310 is a commercially available product sold by the Eagle Signal Control Company, Model No. CX 401. The CX 401 unit uses a microprocessor system contained in a 15 terminal plug-in case. Timer operation and time range is selected by six miniature switches located inside the unit housing. Time values are fed into the unit using a sealed membrane keypad. The unit also contains a liquid crystal display to indicate time values. The CX 401 has three relay outputs. The unit includes a plurality of number control keys 352, a "Set 1" key 354, a "Set 2" key 356 and an enter key 358, the function of which will be described hereinafter. The timer unit 310 can be set for a time duration ranging from 1 second to 199 minutes.

The AC/DC inverter 320 is designed to operate the system at 12 volts DC. This is desirable from a safety and efficiency standpoint. A preferred AC/DC inverter unit is that manufactured by B-W Manufacturers, Inc., Model 3215 or 3220. The model 3215 is designed for a 15 AMP maximum continuous load, while the model 3220 is designed for a 20 AMP maximum continuous load. The model 3220 is used when an auxiliary pump is necessary to augment water pressure, as discussed above. Also, the model 3220 may be necessary in systems designed for especially large produce display cases Relays 330, 332 are preferably of the type manufactured by the Eagle Signal Control Company, Model 22Q-2CA-120 (120 V-10 A). Relay 330 includes breaker contacts 335, 336, 337, and 338 as schematically illustrated in FIG. 5. Relay 332 includes breaker contacts 340, 341, 342, and 343, also schematically illustrated in FIG. 5. The relay 334 is a time delay relay manufactured by the Eagle Signal Control Company, Model 80Q-2A-604 (120 V-10 A). The time delay relay 334 is controlled using a CMOS integrated circuit, an internal potentiometer controlled oscillator, and a programmable binary counter.

The wiring diagram shown in FIG. 5 shows the arrangement used to connect the timer control system 300 to the other portions of the invention 10. All numbers shown in FIG. 5 are pin numbers of the timer unit and relays, as conventionally known in the art.

OPERATION

A typical operational sequence in which the various functional aspects of the invention 10 will be explained is presented below To begin, the invention is first charged with water. Water flow is initiated into the water inlet line 20, through the manually operable shut-off valve 26. Water then enters the inlet 30 of the filter unit 32, flows through the internal cylindrical strainer 36, rises through the body portion 44 of the filter unit 32, and exits through the outlet 106. The water flow path is designated by arrows 359 in FIG. 3. From the outlet 106, filtered water is ultimately delivered from the filter unit 32 to the produce, as discussed below.

Next, water passes from the filter unit 32 through the pressure regulator 110, through the pump 124 (if applicable) and into the multi-port fitting 136. It should be noted that the pump, if used, is wired directly to the AC/DC inverter 320, and is controlled using the internal micro-switch system discussed above. The water then passes through the multi-port fitting 136, through the pipe section 144, and into the tank 160 where the water presses against the internal diaphragm 162. As a result the diaphragm 162 moves outward, causing significant water pressure (50-75 p.s.i.) to be built up within the system, especially within water delivery pipe 179. The water pressure comes from both the tank 160, and the water coming in through the inlet line 20 into the multi-port fitting 136. At this stage, valves 74, 182, and 240 are closed, and the system is charged with water ready to pass through the valve 182.

Next, the timer unit 310 is set. As noted above, the unit 310 will accept time increments from one second up to 199 minutes. For the purposes of this example, a five minute cycle time with a 10 second spray duration will be selected. However, the cycle time and spray durations are variable, depending on the size and type of the produce display rack, the type of produce involved, and the temperature/humidity conditions in the surrounding environment. To enter the cycle time into the timer unit 310, the "Set 1" key 354 is pushed, and the time is entered using control keys 352. After the appropriate cycle time is entered, the enter key 358 is pushed. To enter the spray duration, the "Set 2" key 356 is pressed, followed by the activation of control keys 352 and the enter key 358. The system then counts down until four minutes and 50 seconds have elapsed. During the countdown, the system is in a mode wherein all of the double pole, double throw valves 74, 182, 240 are closed (FIG. 5). Specifically, with respect to valve 182, current flows through closed breaker contacts 336, 337 of relay 330. As a result, valve 182 is maintained in a closed position. Breaker contacts 335, 338 are open and do not allow current passage. Likewise, current flows through breaker contacts 341, 342 of relay 332 so as to maintain valves 74 and 240 in a closed position. Breaker contacts 340, 343 are open and do not allow current passage.

When the four minutes and 50 seconds have elapsed, pin number 1 of relay 330 is energized by the timer unit 310. As a result, the breaker contacts 336, 337 open and breaker contacts 335, 338 close, reversing the flow of current into valve 182, causing it to open. Water then flows through valve 182 into external water delivery line 198 and through the spray heads 226, 228, delivering a fine, cooling mist to the produce materials in the rack.

After 10 seconds, the timer unit 310 causes pin 8 of the relay 330 to become energized. This reverses the state of breaker contacts 335, 336, 337, and 338 and closes valve 182, thus stopping water delivery. Simultaneously, pin number 1 of the relay 332 is energized, which opens breaker contacts 341, 342 and closes breaker contacts 340, 343, reversing the flow of current into valves 74, 240, causing them to open at the same time valve 182 closes. This causes two things to occur. First, because of the flow restricting character of the spray tips 232, 234 in spray heads 226, 228, significant pressure builds up within the external water delivery line 198. When the valve 240 opens and the valve 182 closes, such pressure causes the residual water in the external water delivery line 198 to be forcibly removed through the valve 240 and conduit 248 out of the system. This prevents water drippage from the spray heads 226, 228, and avoids the problems associated therewith. At the same time, when valve 74 opens, collected foreign materials inside the cylindrical strainer 36 of the filter unit 32 are allowed to pass out of the outlet 46 (via center post 38) through the valve 74, through conduit 88, and out of the system. The flow of particulate materials out of the filter unit 32 is shown by arrows 360 in FIG. 3. The pressure to accomplish this is supplied by incoming water flowing through the water inlet line 20 into the filter unit 32.

Valves 74 and 240 are preferably open for approximately four seconds through the action of the time delay relay 334, which is adjustable as desired. The breaker contact 348 shown in FIG. 5 is part of the relay 334, and stays closed constantly. Thereafter, pin 8 of relay 332 is energized which reverses the state of the breaker contacts 340, 341, 342, 344 and closes valves 74, 240. The system is then ready for another cycle to begin.

The present invention represents an advance in produce hydration. It permits water to be delivered to a produce rack in a clean, efficient, and economical manner. Furthermore, through the use of a pressurized system, water is delivered instantaneously to the produce without a slow, gradual buildup. Also, after a preselected time period, water delivery is instantly stopped, thereby avoiding undesired water drippage onto the produce materials. The system alleviates the major causes of wetside produce shrink, while saving labor dollars through automation. The automatic timing device of the system permits water to be delivered over a 24 hour period, thereby eliminating hand watering and the use of protective covering materials when the store is closed. The mist created by the system is barely noticeable by the shopper. Tests have shown that a spray duration of 10 seconds every 15 minutes is sufficient to keep vegetables as crisp and fresh as they can be.

The mist created by the invention is readily absorbed by the vegetables. This gives them an appealing visual appearance. Also, use of the system lowers the temperature of the produce materials and further prolongs shelf life. After installation of the system, a six to eight degree drop in case temperature is normally achieved. In refrigerated produce cases, this reduces the amount of mechanical refrigeration which is needed to maintain the produce temperatures at a desired level.

From a safety standpoint, the invention delivers the correct amount of moisture to the produce without spillage into surrounding areas of the store. As a result, safety problems associated with water spillage onto the floor are eliminated.

Research has been conducted to demonstrate the efficiency of the present invention in comparison with traditional produce hydration methods. In a produce department where hand watering is used and approximately one gallon of water is applied three times per hour over a 15 hour daily period, approximately 16,524 gallons of water per year are used. For a 24 hour period, 26,280 gallons per year are used. In contrast, the present invention in a 60 foot produce section having 80 nozzles designed to deliver 1 g.p.h. over a 24 hour period will use 8000 gallons per year, resulting in a substantial water savings.

Produce departments equipped with the present invention can expect sales increases resulting in increased profits. The major reason for sales increases involves enhanced produce quality and reduction of shrinkage. For a produce section having weekly sales of $10,000 and a weekly spread of 30%, it is estimated that use of the invention would result in an increase in gross profit of between $300 and $600 weekly, with an average increase of $450 per week. This represents an estimated yearly increase in gross profit of approximately $23,400. It has been further estimated that total savings including labor, shrinkage, and increased sales for a produce section generating $10,000 per week would amount to $41,547 for a store open 15 hours per day and $41,417 for a store open 24 hours per day.

Finally, research also indicates the dramatic reduction in shrinkage resulting from use of the present invention. Table 1 involves a comparison of weekly shrinkage at a produce section in a typical supermarket with sales averaging $5000 per week.

TABLE 1

| Product | After Installation Of Invention | Before Installation Of Invention | Retail Price | Savings Total |
|---|---|---|---|---|
| Turnips | 5 lbs | 10 lbs | $ .32 lbs | $ 1.60 |
| Carrots (clip top) | 2 lbs | 14 lbs | .31 lbs | 3.72 |
| Bok choy | 3 lbs | 10 lbs | .48 lbs | 3.36 |
| Red potatoes | 1 lbs | 8 lbs | .19 lbs | 1.32 |
| Zuchini | 5 lbs | 15 lbs | .51 lbs | 5.10 |
| White potatoes | 1 lbs | 8 lbs | .24 lbs | 1.68 |
| Spinach | 4 bu | 21 bu | .51 bu | 8.67 |
| Peppers | 20 ea | 45 ea | .38 ea | 9.50 |
| Cauliflower | 14 ea | 21 ea | .44 ea | 9.24 |
| Mustard greens | 4 ea | 24 ea | .59 ea | 11.80 |
| Rutabega | 5 lbs | 10 lbs | .30 lbs | 1.50 |
| Leaf lettuce | 10 hd | 50 hd | .60 hd | 24.00 |
| Radish | 12 bu | 70 bu | .33 bu | 19.00 |
| Green onion | 6 bu | 42 bu | .33 bu | 11.88 |
| Cucumbers | 10 ea | 20 ea | .25 ea | 2.50 |
| Broccoli | 5 bu | 10 bu | .58 bu | 8.70 |
| Cabbage | 7 lbs | 14 lbs | .33 lbs | 2.31 |

Based on the information in Table 1, use of the invention results in an estimated average weekly savings of approximately $130.80 in shrinkage costs per week, with an average yearly savings of $6801.60. Estimated savings for produce departments with sales greater than $5,000 per week are shown below in Table 2.

TABLE 2

| Average Sales Per Week | Savings Per Year |
|---|---|
| $10,000 | $13,603.20 |
| $15,000 | $20,404.80 |
| $20,000 | $27,206.40 |
| $25,000 | $34,008.00 |

Finally, operation of the invention may be further enhanced through the use of additional convenience-oriented accessories associated with the system. For example, it is contemplated that an infrared or other type of electric eye system may be connected to the invention and produce rack. This system would instantly shut off the water spray through the nozzles if such spray occurred when a shopper placed his hand into the produce display rack. A system usable in the invention would include that manufactured by the Photoswitch Division of the Electronics Corporation of America. This system includes a Model 47-CN4-4004 receiver, 40-CA4-4004 light source, 60-1711-4004 extended lens, 60-1600-4004 power base, 22-DJ3-4000 on/off module, and 8-485 plug-in relay. In operation, the system would project a visible LED beam across the produce rack. Interruption of the beam would stop the spray of water.

Furthermore, it is contemplated that a water purification system could be associated with the system in order to further enhance its operation and efficiency. A preferred water purification system would be of the type manufactured by the Electro Pure Corporation. The Electro Pure system involves a cell 600 (FIG. 1) having a plurality of titanium plates coated with platinum. When electrical current is introduced into the cell 600, minerals and other particulates are attracted to and collected on the plates. Thereafter, the system includes means for reversing the polarity of the unit, causing the collected materials to detach from the plates. The Electro Pure unit would be mounted upstream from the filter unit 32. This arrangement permits the materials detached from the plates to be retained in the filter unit 32. Ideally, it would be positioned between the inlet 30 of the filter unit 32 and the side wall 18 so as to encase the Electro Pure unit within the enclosure box 12. In addition to removing undesired minerals and particulates, the Electro Pure unit increases the oxygen content of the water which tends to increase the shelf life and freshness of the produce.

Having fully described one embodiment of the present invention, it is intended that various changes, modifications, and/or alterations may be made to the invention and still be within the scope thereof. Such changes may involve modifications or alterations in materials, components, structural arrangements, capacities, and operational features of the invention. Therefore, the present invention shall only be construed in accordance with the following claims.

We claim:

1. A system for supplying water from a water to produce materials in a display rack comprising:
    water delivery means for supplying water from said source onto said produce in said display rack, said water delivery means comprising flow control means for supplying said water to said produce at selected time intervals, pressurization means for pressurizing said water prior to said delivery of said water to said produce, and means for storing pressurized water within said system until said flow control means allows said water to be released from said systems, whereby said pressurized water is then instantly delivered to said produce; and drippage control means operatively connected to said water delivery means to prevent residual water drippage onto said produce in said rack when said water delivery means is not delivering water.

2. A system for supplying water from a water source to produce materials in a display rack comprising:

water delivery means for delivering water from said source onto said produce in said display rack, said water delivery means comprising flow control means for supplying said water to said produce at selected time intervals; and drippage control means operatively connected to said water delivery means for preventing residual water drippage onto said produce in said rack when said water delivery means is not delivering water.

3. The system of claim 2 whrein said system further comprises demineralization means in fluid communication with said water delivery means for removing minerals from said water prior to the delivery thereof from said system.

4. The system of claim 2 wherein said system further comprises oxygenation means in fluid communication with said water delivery means for increasing the oxygen content of said water prior to the delivery thereof from said system.

5. A system for supplying water from a water source to produce materials in a display rack comprising:

filter means for collecting and removing foreign particulate materials from said water received from said source;

water delivery means in fluid communication with said filter means for supplying filtered water from said filter means onto said produce in said display rack, said water delivery means comprising flow control means for supplying said water to said produce at selected time intervals during the operation of said system;

drippage control means operative residual connected to said water delivery means for preventing water drippage onto said produce in said rack when said water delivery means is not delivering water; and automatic filter cleaning means operatively connected to said filter means for removing collected particulate materials from said filter means at selected time intervals during the operation of said system, said automatic filter cleaning means further comprising means for expelling said collected particulate materials from said system after removal thereof from said filter means.

6. The system of claim 1 wherein said system further comprises timer control means operatively connected to said drippage control means, automatic filter cleaning means, and flow control means for controlling the operation thereof.

7. The system of claim 5 wherein said filter means comprises an inlet means in fluid communication with said water source to receive water therefrom, said water flowimg from said inlet means into the interior of said filter means, said interior comprising strainer means for removing foreign particulate materials from said water, said water passing through said strainer means and through a water flow outlet means in said filter means, with said particulate materials being retained by said strainer means and thereafter directed through a particulate drain outlet means in said filter means so as to permit the removal of said particulate materials from said filter means.

8. The system of claim 7 wherein said water delivery means further comprises:

a conduit in fluid communication with said water flow outlet means of said filter means for directing filtered water therefrom into a tank comprising means therein for pressurizing said water within said tank; and a water flow control valve comprising an inlet means in fluid communication with said conduit at a position between said tank and said filter means.

9. The system of claim 8 wherein said water flow control valve comprises a solenoid-actuated ball valve.

10. The system of claim 8 further comprising a water pressure pump in fluid communication with said conduit of said water delivery means between said filter means and said tank.

11. The system of claim 8 wherein said tank comprises an internal resilient diaphragm, the entry of water into said tank causing said diaphram to move resiliently outward, thereby causing said diaphram to generate sufficient pressure within said tank to cause said water to move outwardly through said water flow control valve when open.

12. The system of claim 8 wherein said water flow control valve further comprises an outlet means in fluid communication with an external water delivery line secured to said display rack, said external water delivery line comprising a plurality of water dispensing outlet means each comprising restriction means for controlling the flow of water through said dispensing outlet means, whereby said water flow control valve, when open, permits water to flow from said filter means and said tank into and through said external water delivery line and through said dispensing outlet means therein, said restriction means causing said water to be delivered to said produce in said rack in a mist-like spray, said restriction means also causing an increase in water pressure to occur with said external water delivery line.

13. The system of claim 12 wherein said water dispensing outlet means in said external water delivery line each comprise at least one spray head comprising flow restricting means therein for restricting the flow of water therethrough.

14. The system of claim 12 wherein said drippage control means comprises a drippage control valve having an inlet means in fluid communication with said external water delivery line and an outlet means in fluid communication with a water drain line, whereby water within said external water delivery line flows through said drippage control valve and through said water drain line when said drippage control valve is open and said water flow control valve is closed, said flow of water through said drippage control valve resulting from said increased water pressure within said external water delivery line caused by said restriction means therein.

15. The system of claim 14 wherein said drippage control valve comprises a solenoid-actuated ball valve.

16. The system of claim 14 wherein said automatic filter cleaning means comprises a filter purge valve having an inlet means in fluid communication with said particulate drain outlet means in said filter means, and an outlet means in fluid communication with a particulate drain line, whereby foreign particulate materials passing through said particulate drain outlet means in said filter means are permitted to flow through said filter purge valve into said particulate drain line and out of said system when said drippage control and filter purge valves are open, and said water flow control valve is closed.

17. The system of claim 16 wherein said filter purge valve comprises a solenoid-actuated ball valve.

18. The system of claim 5 further comprising an enclosure box, where by said enclosure box functions as a housing for said system.

19. The system of claim 5 wherein said system further comprises demineralization means in fluid communication with said water delivery means for removing minerals form said water prior to delivery thereof from said system.

20. The system of claim 5 wherein said system further comprises oxgenation means in fluid communication with said water delivery means for increasing the oxygen content of said water prior to the delivery thereof from said system.

21. A system for supplying water from a water source to produce materials in a display rack comprising:
  filter means for collecting and removing foreign particulate materials from said water received from said source,
  water delivery means comprising a conduit in fluid communication with said filter means for directing filtered water therefrom into a tank comprising means therein for pressurizing said water within said tank, and a water flow control valve comprising an inlet means in fluid communication with said conduit at a position between said tank and filter means and an outlet means in fluid communication with an external water delivery line, said external water delivery line comprising a plurality of water dispensing outlet means each comprising restriction means therein for controlling the flow of water through said dispensing outlet means, whereby said water flow control valve, when open, permits water to flow from said filter means and said tank into and through said external water delivery line and through said dispensing outlet means therien, said restriction means causing said water to be delivered to said produce in said rack in a mist-like spray, said restriction means also causing an increase in water pressure to occur within said external water delivery line;
  drippage control means operatively connected to said water delivery means for preventing residual water drippage onto said produce when said water delivery means is not delivering water, said drippage control means comprising a drippage control valve having an inlet means in fluid communication with said external water delivery line and an outlet means in fluid communication with a water drain line, whereby water within said external water delivery line flows through said drippage control valve and through said water drain line when said drippage control valve is open and said water flow control valve is closed, said flow through said drippage control valve resulting from said increased water pressure within said external water delivery line caused by said restriction means therein; and
  automatic filter cleaning means operatively connected to said filter means for removing collected particulate materials from said filter means at selected time intervals during the operation of said system.

22. The system of claim 21 wherein said system further comprises timer control means operativley connected to said drippage control valve and said water flow control valve for opening and closing said drippage control valve and water flow control valve.

23. A system for supplying water from a water source to produce materials in a display rack comprising:
  filter means for collecting and removing foreign particulate materials from said water received from said source, said filter means comprising an inlet means for communicating with said water source to receive water therefrom, said water flowing from said inlet means into the interior of said filter means, said interior comprising strainer means for removing foreign particulate materials from said water, said water passing through said strainer means and through a water flow outlet means in said filter means, with said particulate materials being retained by said strainer means and thereafter directed through a particulate drain outlet means in said filtler means so as to permit the removal of said particulate materials from said filter means;
  water delivery means in fluid communication with said filter means for supplying filtered water from said filter means onto said produce in said display rack, said water delivery means comprising flow control means for supplying water to said produce at selected time intervals during the operation of said system;
  drippage control means operatively connected to said water delivery means for preventing residual water drippage onto said produce in said rack when said water delivery means is not delivering water; and
  automatic filter cleaning means operatively connected to said filter means for removing said particulate materials from said filter means at selected time intervals during the operation of said system, said automatic filter cleaning means comprising a filter purge valve having an inlet means in fluid communication with said particulate drain outlet means in said filter means, and an outlet means in fluid communication with a particulate drain line, said filter purge valve permitting the flow of particulate materials from said particulate drain outlet means in said filter means through said particulate drain line and out of said system when said filter pruge valve is open.

24. The system of claim 23 wherein said system further comprises timer control means operatively connected to said drippage control means, automatic filter cleaning means, and flow control means for controlling the operation thereof.

25. A system for supplying water from a water source to produce materials in a display rack comprising:
  filter means for collecting and removing foreign particulate materials from said water received from said source, said filter means comprising an inlet means for communicating with said water source to receive water therefrom, said water flowing from said inlet means into the interior of said filter means, said interior comprising strainer means for removing foreign particulate materials from said water, said water passing through said strainer means and through a water flow outlet means in said filter means, with said particulate materials being retained by said strainer means and thereafter directed through a particulate drain outlet means in said filter means so as to permit the removal of said particulate materials from said filter means;

water delivery means comprising a conduit in fluid communication with said water flow outlet means of said filter means for directing filtered water therefrom into a tank comprising means therein for pressurizing said water within said tank, and a water flow control valve comprising an inlet means in fluid communication with said conduit at a position between said tank and filter means and an outlet means in fluid communication with an external water delivery line, said external water delivery line comprising a plurality of water dispensing outlet means each comprising restriction means therein for controlling the flow of water through said dispensing outlet means, whereby said water flow control valve, when open, permits water to flow from said filter means and said tank into said through said external water delivery line and through said dispensing outlet means therein, said restriction means causing said water to be delivered to said produce in said rack in a mist-like spray, said restriction means also causing an increase in water pressure to occur within said external water delivery line;

drippage control means operatively connected to said water delivery means for preventing residual water drippage onto said produce when said water delivery means is not delivering water, said drippage control means comprising a drippage control valve having an inlet means in fluid communication with said external water delivery line and an outlet means in fluid communication with a water drain line, whereby water within said external water delivery line flows through said drippage control valve and through said water drain line when said drippage control valve is open and said water flow control valve is closed, said flow through said drippage control valve resulting from said increased water pressure within said external water delivery line caused by said restriction means therein;

automatic filter cleaning means operatively connected to said filter means for removing said particulate materials from said filter means at selected time intervals during the operation of said system, said automatic filter cleaning means comprising a filter purge valve having an inlet means in fluid communication with said particulate drain outlet means in said filter means and an outlet means in fluid communication with a particulate drain line, whereby foreign particulate materials passing through said particulate drain outlet means in said filter means are permitted to flow through said filter purge valve into said particulate drain line and out of said system when said drippage control and filter purge valve are open, and said water flow control valve is closed; and timer control means operatively connected to said flow control valve, drippage control valve, and filter purge valve for controlling the operation thereof.

* * * * *

UNITED STATES PATENT AND TRADEMARK OFFICE
CERTIFICATE OF CORRECTION

PATENT NO. : 4,808,303
DATED      : February 28, 1989
INVENTOR(S) : Tim L. Edwards and James A. Aamondt It is certified that error appears in the above-identified patent and that said Letters Patent is hereby corrected as shown below:

Column 4, line 52, "Ir" should be --If--.
Column 5, line 8, "$\mu$" should be --3/4--.
Column 5, line 14, "$\mu$" should be --3/4--.

In the Claims:

Column 10, line 65, insert the word --source-- between the words "water" and "to".
Column 11, line 47, "operative" should be --operatively-- and delete the word "residual".
Column 11, line 48, insert the word --residual-- between the words "preventing" and "water".
should be --and--.
Column 12, line 46, "with" should be --within--.
Column 13, line 34, "thereform" should be --therefrom--.
Column 15, line 24, the word "said" between words "into" and "through" should be --and--.

Signed and Sealed this

Twenty-second Day of October, 1991

Attest:

HARRY F. MANBECK, JR.

Attesting Officer

Commissioner of Patents and Trademarks